(12) United States Patent
Wooldridge

(10) Patent No.: US 10,206,831 B2
(45) Date of Patent: Feb. 19, 2019

(54) APPARATUS FOR WHEELCHAIR STEERING AND WHEELCHAIR INCORPORATING THE SAME

(71) Applicant: Glen R. Wooldridge, SeaTac, WA (US)

(72) Inventor: Glen R. Wooldridge, SeaTac, WA (US)

(*) Notice: Subject to any disclaimer, the term of this patent is extended or adjusted under 35 U.S.C. 154(b) by 95 days.

(21) Appl. No.: 15/657,502

(22) Filed: Jul. 24, 2017

(65) Prior Publication Data

US 2018/0049931 A1    Feb. 22, 2018

Related U.S. Application Data

(60) Provisional application No. 62/375,844, filed on Aug. 16, 2016.

(51) Int. Cl.
| | |
|---|---|
| *A61G 5/10* | (2006.01) |
| *B62D 7/20* | (2006.01) |
| *B62D 9/00* | (2006.01) |
| *A61G 5/12* | (2006.01) |

(52) U.S. Cl.
CPC ............ *A61G 5/1051* (2016.11); *A61G 5/128* (2016.11); *B62D 7/20* (2013.01); *B62D 9/00* (2013.01)

(58) Field of Classification Search
CPC .......... B62B 9/00; A61G 5/02; A61G 5/1051; A61G 5/128
See application file for complete search history.

(56) References Cited

U.S. PATENT DOCUMENTS

| 3,017,199 | A | * | 1/1962 | Sechrist | .................. A61G 5/10 280/269 |
|---|---|---|---|---|---|
| 3,388,926 | A | * | 6/1968 | Bardsley | ................. A61G 5/10 280/265 |
| 3,810,658 | A | | 5/1974 | Weimer, Sr. | |
| 4,241,932 | A | | 12/1980 | Hartmann | |
| 4,586,723 | A | * | 5/1986 | Nabinger | ................ A61G 5/10 280/250.1 |
| 9,724,253 | B2 | * | 8/2017 | Watwood | ............. A61G 5/1051 |

FOREIGN PATENT DOCUMENTS

EP    1 627 619 A2    2/2006

* cited by examiner

*Primary Examiner* — Tony H Winner
*Assistant Examiner* — Michael R Stabley
(74) *Attorney, Agent, or Firm* — Christensen O'Connor Johnson Kindness, PLLC; Ryan E. Dodge, Jr.

(57) ABSTRACT

A steering attachment for a wheelchair includes an arm assembly configured to engage a wheelchair fork comprising two outer bars connected to a shorter center member, thereby defining a gap on one end of the arm assembly to engage the fork. Attachment apertures extend through the outer bars and center member configured to receive attachment members to adjustably assemble the arm assembly to accommodate a particular fork blade. A link pivotally is connected to an opposite end of the bar assembly, and is hinged to move between an extended position and a folded position. A foot support is pivotally connected to an upper wall of the link and configured to pivot about an axis perpendicular to the pivot axis of the link. The steering attachment is connectable to a wheelchair with a single pull pin.

19 Claims, 6 Drawing Sheets

APPARATUS FOR WHEELCHAIR STEERING AND WHEELCHAIR INCORPORATING THE SAME

CROSS-REFERENCE TO RELATED APPLICATION

This application claims the benefit of Provisional Application No. 62/375,844, filed Aug. 16, 2016; the entire disclosure of said application is hereby incorporated by reference.

BACKGROUND

Hemiparesis is a condition typified by unilateral weakness or partial loss or impairment of voluntary movement of the entire left or right side of the body. Hemiplegia, in its most severe form, is a complete paralysis on one side of the body. Wheelchair mobility for persons with hemiparesis or hemiplegia presents particular challenges because conventional manual wheelchairs typically require the user be able to apply power bilaterally to the wheelchair in order for the user to self-power and steer the wheelchair. Similarly, persons suffering from a loss of both an arm and a leg (on the same side or on opposite sides), or loss of control of both an arm and a leg, are typically unable to propel and control a conventional manual wheelchair.

Using conventional manual wheelchairs such persons, even though they may have good control and strength on one side of their body (or good use of an arm and a leg on opposite sides of their body), may be forced to rely on caretakers or others to push them whenever they need to move to another location. This, of course, limits their ability to live on their own, or even to safely spend significant time alone.

One wheelchair alternative to persons suffering from hemiparesis or hemiplegia is to acquire a powered wheelchair that can be operated by one hand. Such wheelchairs, however, are quite expensive, and do not provide the user with the physical activity associated with self-powered wheelchairs. Moreover, powered wheelchairs are more prone to malfunction or simply running down their power source, and they are much more difficult to transport between distant locations in a car, or the like.

For example, U.S. Pat. No. 4,241,932, to Hartmann, which is hereby incorporated by reference in its entirety, discloses a wheelchair steering apparatus that requires a user to twist or turn his or her ankle to steer the wheelchair. Twisting the ankle can be very hard and uncomfortable, and over time the twisting may cause injury to the ankle. The foot turntable mounts to the chair's original footrest greatly restricting the turning radius making it hard to maneuver in tight areas and not possible to turn 180 degrees in one spot. The rigid mounted turntable and tie rods, which require tools to remove, restrict the ability of an assistant to push and steer the chair. The Hartmann device also interferes with the caster full range of motion.

In U.S. Pat. No. 3,810,658, to Weimer, Sr., which is hereby incorporated by reference, a steerable wheelchair apparatus is disclosed, with a tie bar connecting the chair's front casters together. This construction would not allow for tight turns. Also, the disclosed device would interfere with the user (or an assistant) from making tight turns, for example, in narrow hallways, or the like. The Weimer, Sr., chair would also be difficult for many users because the turning device is operated from the user's upper leg. Another disadvantage is that this system is not easily removable thus hampering said chair with steering restrictions.

There remains a need for a steerable device for a manual wheelchair that does not require the user to twist their ankle to steer, that allows the user to execute a tight turn in a confined area, and that is readily removable. An improved steering device will provide improved independence, particularly for persons with hemiparesis, hemiplegia, and the like, who may otherwise require others to push them, or to obtain and use an expensive and cumbersome electric wheelchair. In addition, devices in accordance with the present invention allow the user to steer without having to turn or twist their foot and ankle, and in some embodiments may be attached or removed without requiring any tools and/or may be rotated out of the way when not in use.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A steering attachment for a manual wheelchair includes an arm assembly with a first outer bar and a second outer bar. The first and second outer bars each includes a first end portion with a first attachment aperture, a center portion with two interior apertures, and a second end portion with a second attachment aperture. The arm assembly further includes an inner member disposed between the center portion of the first and second outer bars such that a gap is defined between the first end portions of the first and second outer bars. A pull pin is removably insertable through the first attachment apertures of the first and second outer bars. A link having an upper wall, a lower wall, and side walls with aligned apertures is pivotally connected to the second end portions of the first and second outer bars with a pivot pin. A foot support pivotally connected to the upper wall of the link. First and second attachment members join the first outer bar, the middle member, and the second outer bar.

In an embodiment the first end portions of the first and second outer bars define a recess. In an embodiment the first attachment aperture in each outer bar comprises two first attachment apertures that are symmetrically positioned on the first end portions, such that the first and second outer bars are invertible on the arm assembly.

In an embodiment the second end portions of the first and second outer bars have a semicircular end.

In an embodiment the inner member is trapezoidal, for example, an acute, non-isosceles trapezoid.

In an embodiment the inner member two apertures each comprises a plurality of overlapping circular apertures.

In an embodiment the first and second attachment members are configured to be removed and replaced without tools.

In an embodiment the link is configured to pivot between a deployed position wherein the link extends directly away from the arm assembly to a folded position wherein the link is disposed directly over the arm assembly. For example, the link may be configured to pivot through a range of more than ninety degrees.

A steering attachment is configured to be removably attached to a fork blade of a manual wheelchair, and includes an arm assembly configured to engage the fork blade comprising a first outer bar, a second outer bar, and a shorter inner bar sandwiched between the first and second outer bars, the first outer bar and the second outer bars each having a free end portion with a pair of first attachment apertures and defining a gap therebetween, a hinged end portion with a second attachment aperture, and first and second attachment members configured to be inserted into corresponding apertures in the first outer bar, the inner bar, and the second outer bar. A pull pin is configured to be removably inserted through either of the first attachment apertures. A link having an upper wall, a lower wall, and oppositely disposed side walls with aligned apertures, is connected to the hinged end portions of the first and second outer bar. A foot support is pivotally connected to the upper wall of the link.

In an embodiment a distance between the free end portions of the first and second outer bars is adjustable by removing the first and second attachment members, swapping the first and second outer bars, and re-inserting the attachment members.

In an embodiment the second end portions of the first and second outer bars have a semicircular hinged end portion.

In an embodiment the inner bar is trapezoidal, for example, defining an acute, non-isosceles trapezoid.

In an embodiment the inner bar further comprises two elongate apertures.

In an embodiment the first and second attachment members are configured to be removed and replaced without tools.

In an embodiment the link is configured to pivot through a range of more than ninety degrees.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a perspective view of a modular wheelchair steering assembly configured to permit one-footed steering of a wheelchair, for example, for use by persons with hemiparesis, hemiplegia, or the like;

DETAILED DESCRIPTION

Figure 1:
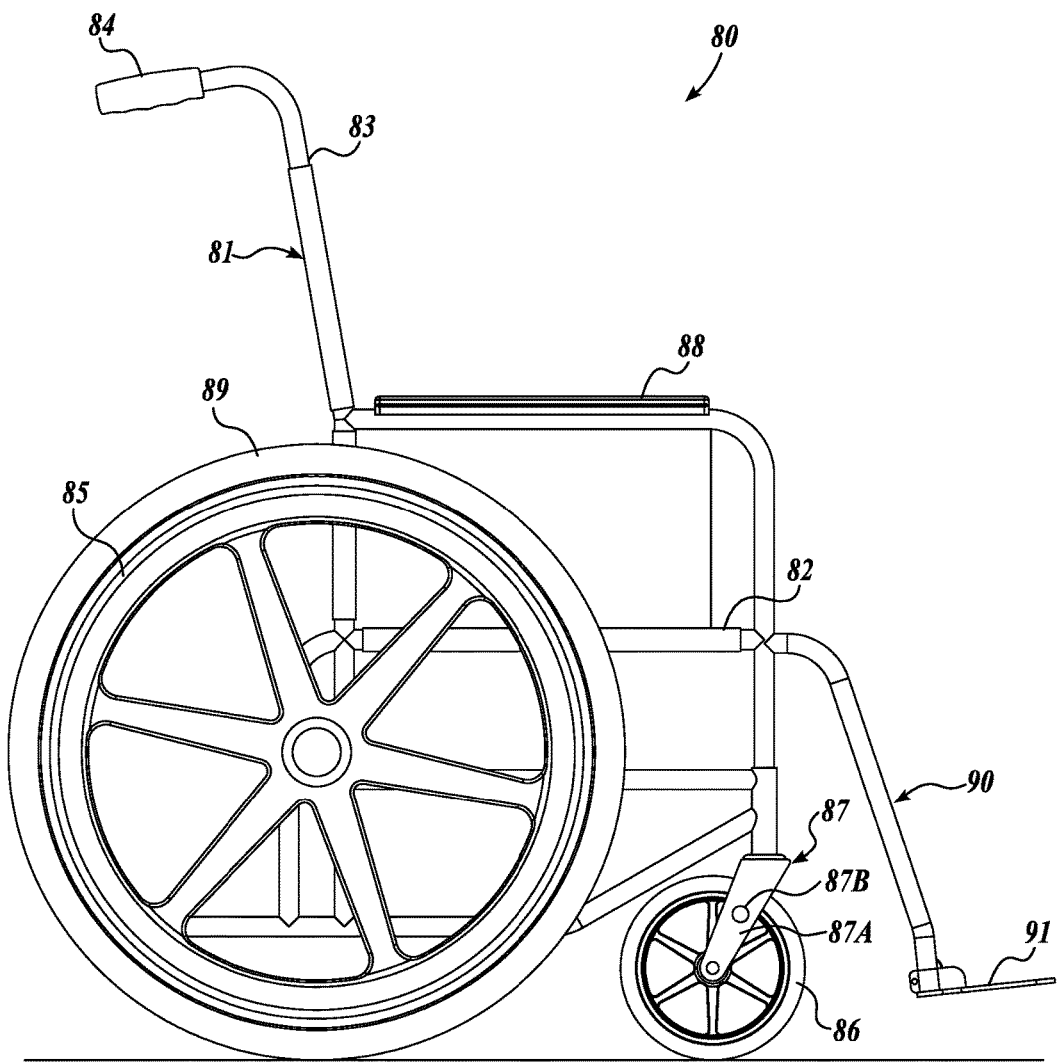
FIG. 1 illustrates a conventional prior art wheelchair.

FIG. 1 is a side view of a conventional prior art, manually propelled wheelchair 80. A manual wheelchair 80 typically includes a frame 81 configured to provide a support for a pliable seat portion 82 and a pliable back portion 83. The frame 81 may include handles 84 to facilitate pushing the wheelchair 80, and armrests 88 for the user. The frame 81 rotatably supports large rear wheels 89 that include an outer handrim 85 that the user may grasp to propel the wheelchair 80. Smaller front caster wheels 86 are rotatably mounted on respective front caster forks 87 that are pivotally attached to the frame 81, typically with a bearing assembly (not shown) that permits the caster wheels 86 to swivel with relatively little friction. The caster forks 87 are typically generally U-shaped, with oppositely disposed blades 87A (one visible) that rotatably mount the associated wheel 86. Left and right legrest hangers 90 extend forwardly and downwardly from the front of the frame 81, and include hinged footplates 91 that are suspended above the ground so that the user can rest their feet while the wheelchair 80 is moving without interfering with the motion of the wheelchair 80. The legrest hangers 90 are typically removable and/or rotate out of the way, for example, to allow the user to rest their feet on the ground or to use their legs to push themselves in the wheelchair 80.

The conventional wheelchair 80 shown in FIG. 1 is not well-designed for persons having hemiparesis or hemiplegia. The wheelchair 80 does not provide for the user self-propelling and/or steering using only one side (left or right) to maneuver the wheelchair. Some wheelchairs provide a means for interlocking the two rear wheels, which would permit a person with hemiparesis or hemiplegia to propel the wheelchair with one arm. However, interlocking the rear wheels does not provide any means or ability to steer the wheelchair 80.

The conventional wheelchair, for example, the wheelchair 80 shown in FIG. 1, is otherwise generally well-designed and is well-tested. It would be beneficial if the conventional wheelchair could be economically adapted to accommodate the needs of persons having hemiparesis or hemiplegia.

An adjustable steering attachment 100 is disclosed (FIG. 2) that can be removably mounted to a conventional wheelchair 80, and that provides persons having hemiparesis or hemiplegia with the ability to self-propel and maneuver their wheelchair, while still retaining the functionality permitting others to push the user in a conventional manner. In the current embodiment the attachment may be positioned to not interfere with the chair being pushed by another, and is readily attachable/detachable from the wheelchair.

The present inventor has found that a wheelchair user can effectively steer a manual wheelchair by controlling the orientation of either one of the front caster wheels 86 while manually propelling the wheelchair using only one of the outer handrims 85.

The disclosed steering attachment 100 will give independence to someone who would otherwise need someone to push them, without requiring the expense and other disadvantages of an electric wheelchair. For example, in comparison to a conventional wheelchair an electric wheelchair is much harder to transport without an appropriate, relatively large and/or modified vehicle.

Figure 2:
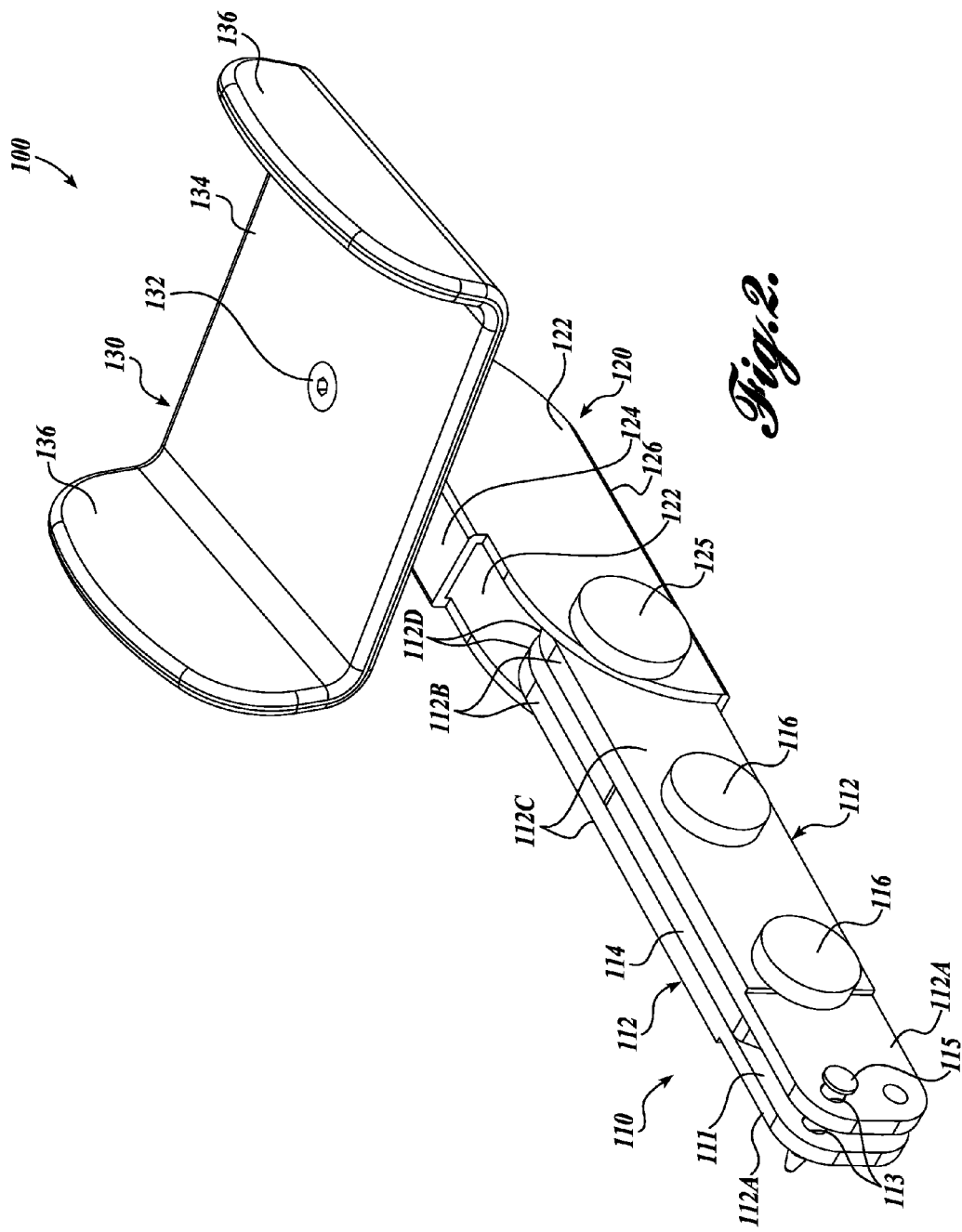
Figure 3:
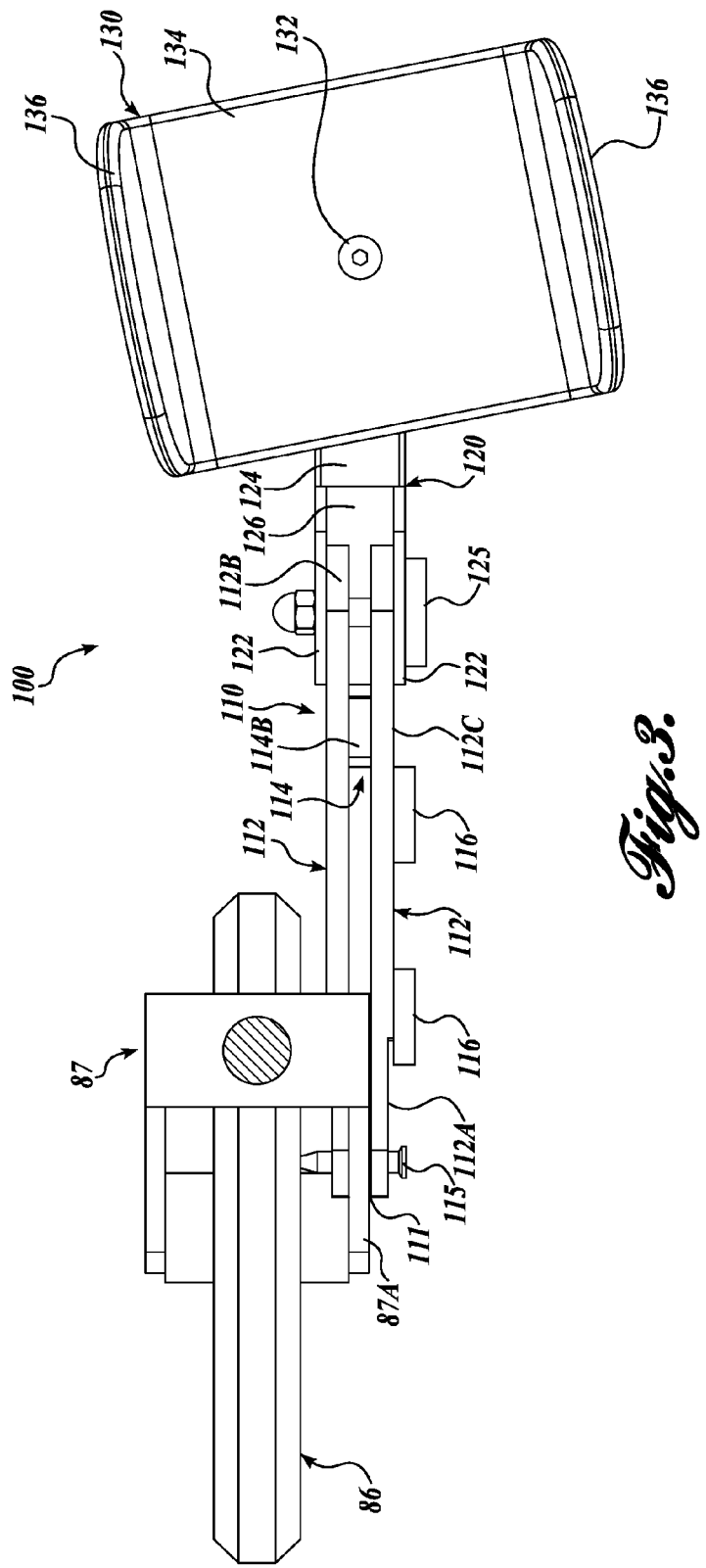
FIG. 3 is a plan view of the modular wheelchair steering assembly shown in FIG. 2 attached to one blade on the mounting fork of a caster wheel assembly.
Figure 6:
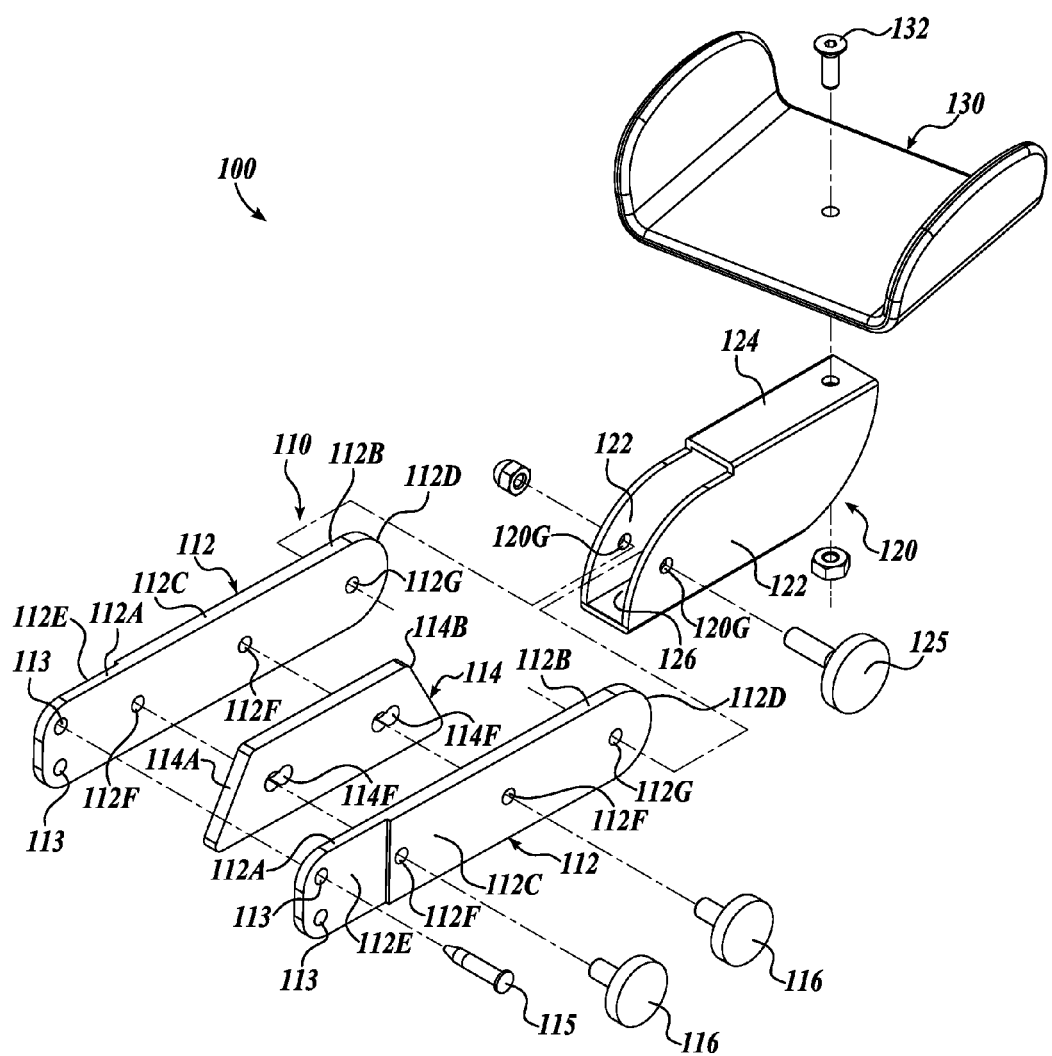
FIG. 6 is an exploded view of the modular wheelchair steering assembly shown in FIG. 2.

FIG. 2 is a perspective view of a removable, adjustable, and foldable steering attachment 100 for a manual wheelchair in accordance with the present invention. Refer also to FIG. 3, which shows a plan view of the steering attachment 100 fixed to a blade 87A of a castor fork 87, and to FIG. 6, which shows an exploded view of the steering attachment 100. The blade 87A has, or is modified to include, an aperture 87B therethrough (see FIG. 1).

The steering attachment 100 comprises an elongate arm assembly 110 that includes two longer outer bars 112, and a shorter inner member 114 disposed between and adjacent to the outer bars 112. The outer bars 112 each include a first end portion 112A, a second end portion 112B, and a center portion 112C. The outer bars 112 in this embodiment include two first attachment apertures 113 symmetrically positioned about the long axis in the first end portion 112A, interior apertures 112F in the center portion 112C located on the long axis of the outer bars 112, and a second attachment aperture 112G on the second end portion 112B. The shorter inner member 114 is adjacent to only the center portions 112C of the outer bars 112 and includes apertures 114F that adjustably align with interior apertures 112F of the outer bars 112. A gap 111 is defined between the first end portions 112A of the outer bars 112. The gap 111 is sized to receive the blade 87A of the castor fork 87. The outer bars 112 and the inner member 114 are releasably joined by attachment members 116 (two shown), for example, conventional bolts, thumb screws, connecting pins, or other attachment hardware as are well-known in the art. The attachment members 116 extend through corresponding ones of interior apertures 112F in the center portions 112C and apertures 114F in the inner member 114. In a current embodiment the attachment members 116 have large heads and are configured to be removable and re-installable without tools.

A pull pin 115 for attaching the arm assembly 110 to the blade 87A of the castor fork 87 is removably inserted through aperture 87B and the upper first attachment apertures 113 in the first end portions 112A of the outer bars 112.

The purpose of the other first attachment aperture 113 in the outer bars 112 disposed opposite the other first attachment aperture 113 will now be appreciated. One or both of the outer bars 112 may alternatively be assembled in an orientation rotated 180 degrees about their long axes, as discussed below, such that the width of the gap 111 is adjustable.

The steering attachment 100 further includes a link 120 that is pivotally attached to the second end portions 112B of the outer bars 112 with a pivot pin 125, and may also be configured to be removed and re-installed without tools. The link 120 includes a pair of side walls 122, an upper wall 124, and a lower wall 126 (see FIG. 6). The second end portions 112B of the outer bars 112 are disposed between the side walls 122 of the link 120, and are pivotally connected to the link 120 with the pivot pin 125 that extends through the second attachment apertures 112G in the outer bars 112, and through aligned apertures 120G in the side walls 122.

The lower wall 126 of the link 120 extends under the second end portions 112B of the outer bars 112, and is positioned and configured to engage the outer bars 112 to prevent the link 120 from pivoting beyond a position approximately in-line with the arm assembly 110. The ends 112D of the outer bars 112 are circular with a radius from the link pivot 125 axis permitting the link 120 to pivot upwardly, preferably more than 90 degrees.

A foot support 130 is pivotally attached to the upper wall 124 of the link 120 with a pivot member 132, such that the foot support 130 is pivotable about an axis that is approximately perpendicular to the pivot axis of the link 120. The foot support 130 includes a floor portion 134 bounded on opposite sides by upwardly extending flanges 136, and configured to receive a user's foot.

Figure 4:
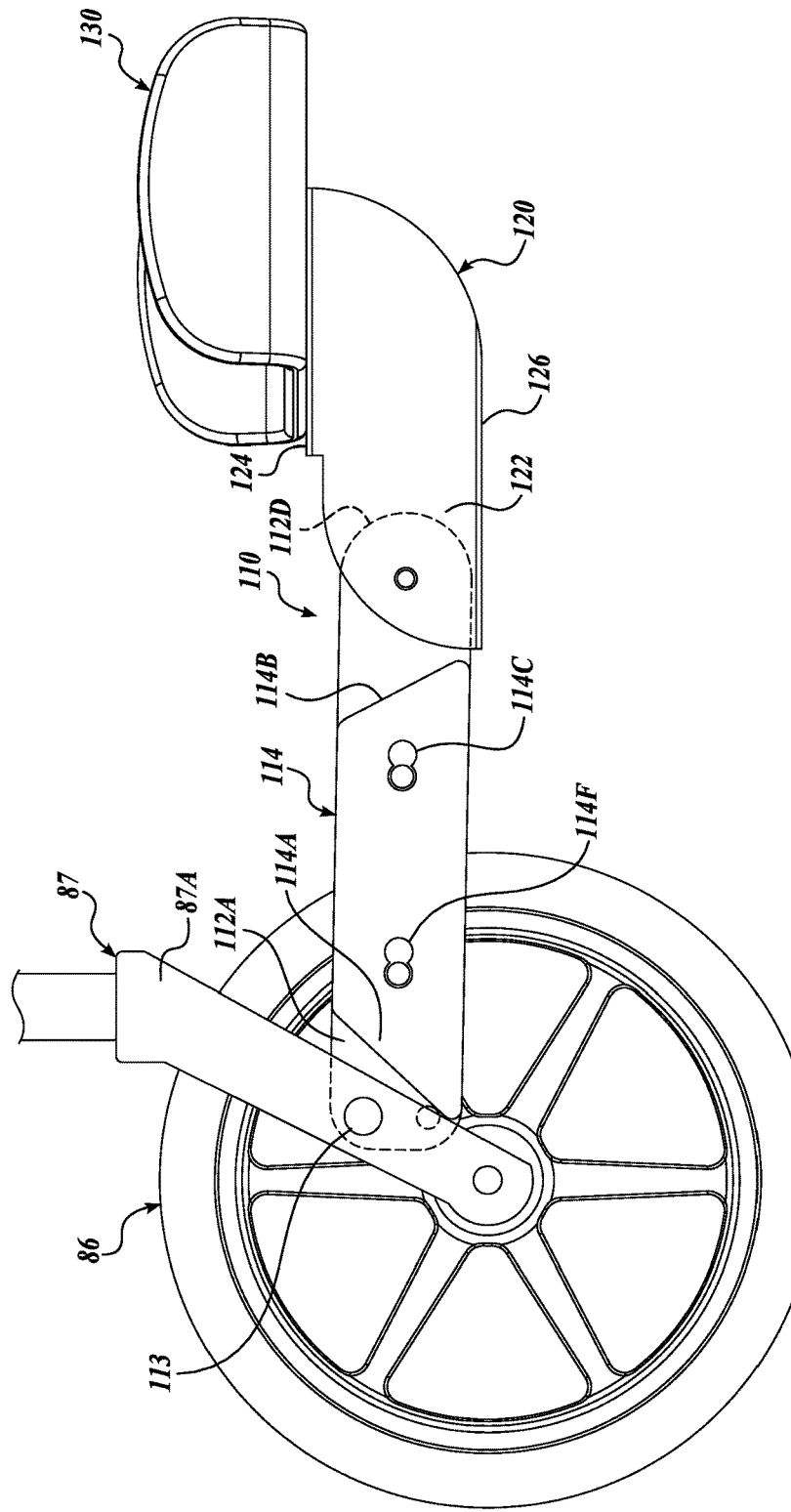
FIG. 4 is a side view of the modular wheelchair steering assembly shown in FIG. 2 mounted on a caster wheel assembly, and with one support bar removed to illustrate certain features of the assembly.

Refer now also to FIG. 4, which shows a side view of the steering attachment 110 and castor wheel 86, with one of the outer bars 112 and the various attachment members 115, 116, and 125 removed to show other aspects of the steering attachment 100. As noted above, the pull pin 115 extends through first attachment apertures 113 in the first end portions of the first and second outer bars 112, and through an aperture 87B in the blade 87A (FIG. 1) aligned between the first attachment apertures 113. Therefore, the steering attachment 100 is readily attachable to (and detachable from) the wheelchair 80 with a single pin 115.

The shorter inner member 114 is sized and positioned to limit the range of motion of the arm assembly 110 with respect to the blade 87A. In the current embodiment the inner member is trapezoidal, preferably defining an acute, non-isosceles trapezoid. It will be appreciated from FIG. 4 that when the steering attachment 100 is attached to the blade 87A it will pivot downwardly due to the weight of the arm assembly 110 and foot support 130 until a lower portion of the first angled end 114A engages and abuts the blade 87A. The steering attachment 100 may similarly be pivoted upwardly until an upper portion of the first angled end 114A abuts the blade 87A. The angular range of motion of the arm assembly 110 on the blade 87A will depend on the angle of the first angled portion 114A of the inner member 114. It is desirable that the first angled end 114A abut the blade 87A in the lower pivot limit (shown in FIG. 4) when the arm assembly 110 is approximately parallel with the ground. For example, it is desirable that the arm assembly 110 be within +/−20 degrees of parallel to the ground when the first angled end 114A abuts the blade 87A in the lower pivot limit.

As shown in FIG. 4, the inner member 114 has a second angled end 114B, that is not symmetric with the first angled end 114A. In this embodiment the inner member 114 may be reversed so that the second angled end 114B is disposed towards the blade 87A, for example, to accommodate different wheelchair caster designs, e.g., to orient the angled end 114A, 114B that most closely matches the angle formed by the caster blade 87A. In some embodiments the arm assembly 110 may include a plurality of interchangeable inner members 114 allowing the arm assembly 110 to be more closely matched to a particular wheelchair design.

As also shown in FIG. 4, the inner member 114 includes apertures 114F for assembly with the outer bars 112 with attachment members 116 (FIG. 2). In this embodiment the apertures 114F comprise a plurality of overlapping circular holes. For simplicity two overlapping circular holes are shown for each aperture 114F, but more than two are also contemplated. The overlapping circular holes allow the inner member 114 to be placed in a selectable position between the outer bars 112. It will be appreciated that the position of the inner member 114 will determine the orientation of the arm assembly 110 during use, which as noted above is preferably approximately parallel to the ground. The user may therefore optimize the deployed position of the steering attachment 100 over a wide range by selecting from the plurality of overlapping holes 114F and/or by reversing the orientation of the inner member 114, and/or by selecting from among two or more inner members 114 such that the inner member 114 abuts the blade 87A when the arm assembly 110 is approximately parallel to the ground.

In another embodiment the attachment members 116 may comprise nuts and bolts, and the inner member 114 may have a pair of elongate slots sized to receive the shaft of the bolts 116, such that the inner member 114 may be slidably positioned before tightening the nuts to selectively position the inner member 114.

Referring now again to FIGS. 3 and 6, in the current embodiment the first end portions of the outer bars 112 define recesses 112E on one side with respect to the center portions 112C, which in the drawings are oriented outwardly. The arm assembly 110 is configured to be alternatively assembled, for example, by rotating the outer bars 112 one hundred eighty degrees about their long axes or by swapping the outer bars 112, such that the recessed sides 112E are oriented inwardly, thereby significantly increasing the width of the gap 111. The arm assembly 110 may therefore be readily configured to accommodate a wide range of blade 87B thicknesses. As discussed above, it is also contemplated that a steering attachment 100 in accordance with the present invention may include a plurality of interchangeable inner members 114. It is contemplated that the plurality of inner members may have different thicknesses, allowing a user to select an inner member 114 to produce a gap width 111 to accommodate a particular wheelchair.

Figure 5:
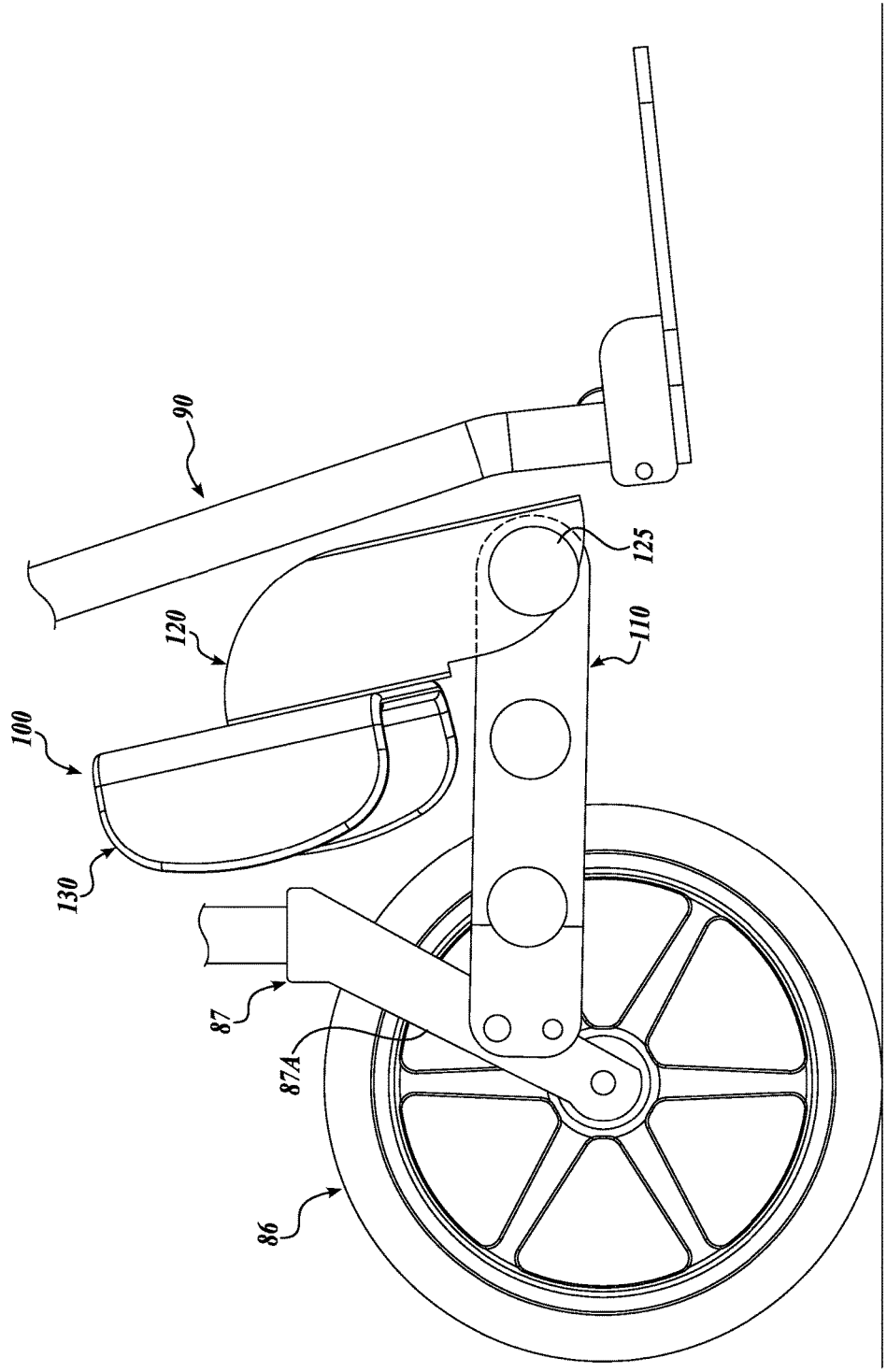
FIG. 5 is a side view of the modular wheelchair steering assembly shown in FIG. 2, in a folded configuration and attached to a wheelchair.

Refer now to FIG. 5, which shows the steering attachment 100 attached to the blade 87A of the fork 87, wherein the link 120 is pivoted upwardly about pivot pin 125, such that the foot support 130 is disposed directly over the arm assembly 110, and the foot support is near to or adjacent the front caster fork 87. The steering attachment 100 in this compact configuration allows the steering attachment to be left attached to the fork 87 when not in use without interfering with the corresponding legrest hanger 90.

To use the steering attachment 100 a user may configure and/or select the outer bars 112 and inner member 114 to accommodate a particular wheel chair fork, and assemble the steering attachment 100 as discussed above. In a current embodiment the steering attachment 100 may be assembled and modified without any tools. If necessary, the fork may be modified to include the aperture 87B.

The steering attachment 100 is then positioned with the fork blade 87B in the gap 111, and aligned to insert the pull pin 114. The user on the chair may then place their foot on the foot support 130 and control the orientation of the caster wheel 86 by moving their foot left and right. It should be appreciated that the relatively long arm assembly 110 and link 120 provide the user with a large mechanical advantage (leverage) to pivot the wheel 86, and the swiveling foot support 130 eliminates the need for the user to twist their ankle when maneuvering the wheel 86.

If help is desired and available, the foot support 130 may be pivoted to a position over the arm assembly 110, where it will not interfere with the use of a legrest hanger 90. Alternatively, the arm assembly 110 may be readily removed by simply pulling the pull pin 115 and sliding the arm assembly 110 away from the fork.

The disclosed wheelchair attachment 100 provides a low-cost, easily installed and adjustable attachment for a conventional manual wheelchair the allows a user having functional control of only one leg and one arm to independently propel, control, and maneuver their wheelchair without assistance. The attachment 100 is adjustable such that it can easily accommodate a wide range of different caster wheel assemblies, and can be attached and removed with a single pull pin, or swiveled out of the way when not in use, allowing a user to use a conventional legrest hanger without removing the steering attachment 100.

While illustrative embodiments have been illustrated and described, it will be appreciated that various changes can be made therein without departing from the spirit and scope of the invention.

The embodiments of the invention in which an exclusive property or privilege is claimed are defined as follows:

1. A steering attachment for a manual wheelchair having a front castor wheel fork, the steering attachment comprising:
    an arm assembly comprising a first outer bar and a second outer bar, each outer bar having a first end portion with a first attachment aperture, a center portion with a plurality of interior apertures, and a second end portion with a second attachment aperture, the arm assembly further comprising an inner member having a plurality of apertures configured to align with the interior apertures of the first and second outer bars, the inner member disposed between the center portion of the first outer bar and the center portion of the second outer bar such that a gap is defined between the first end portions of the first and second outer bars;
    a pull pin configured to be removably inserted through the first attachment apertures of the first and second outer bars;
    a link having an upper wall, a lower wall, and oppositely disposed side walls defining aligned apertures therebetween, wherein the link is hingedly connected to the second end portions of the first and second outer bars through the aligned apertures to pivot about a first axis;
    a foot support pivotally connected to the upper wall of the link to pivot about a second axis; and
    a plurality of attachment members configured to extend through the interior apertures of the first and second outer bars and the plurality apertures of the inner member to join the first outer bar, the inner member, and the second outer bar.

2. The steering attachment of claim 1, wherein the first end portions of the first and second outer bars include a recessed portion.

3. The steering attachment of claim 2, wherein each of the first and second outer bars comprises two first attachment apertures that are symmetrically positioned on the first end portions, such that the first and second outer bars are invertible on the arm assembly.

4. The steering attachment of claim 1, wherein the second end portions of the first and second outer bars have a semicircular end.

5. The steering attachment of claim 1, wherein the inner member is trapezoidal.

6. The steering attachment of claim 5, wherein the inner member defines an acute, non-isosceles trapezoid.

7. The steering mechanism of claim 1, wherein the inner member plurality of apertures each comprises a plurality of overlapping circular apertures.

8. The steering mechanism of claim 1, wherein the plurality of attachment members are configured to be removed and replaced without tools.

9. The steering mechanism of claim 1, wherein the link is configured to pivot from a deployed position wherein the link extends directly away from the arm assembly to a folded position wherein the link is disposed directly over the arm assembly.

10. The steering mechanism of claim 9, wherein the link is configured to pivot through a range of more than ninety degrees.

11. A steering attachment configured to be removably attached to a fork blade of a manual wheelchair, the steering mechanism comprising:
    an arm assembly comprising a first outer bar, a second outer bar, a shorter inner bar sandwiched between the first and second outer bars, and attachment members configured to be inserted through corresponding apertures in the first outer bar, the inner bar, and the second outer bar, wherein the first second outer bars each have a free end portion with a first attachment aperture and a hinged end portion with a second attachment aperture, the free end portions defining a gap therebetween configured to receive the fork blade;
    a pull pin configured to be removably inserted through the first attachment apertures;
    a link having an upper wall, a lower wall, and oppositely disposed side walls with aligned apertures, wherein the link is hingedly connected to the hinged end portions of the first and second outer bars; and
    a foot support pivotally connected to the upper wall of the link.

12. The steering attachment of claim 11, wherein the free end portions of the first and second outer bars define a recessed portion.

13. The steering attachment of claim 12, wherein a gap between the free end portions is adjustable by removing the attachment members, swapping the first and second outer bars, and re-inserting the attachment members.

14. The steering attachment of claim 11, wherein the hinged end portions of the first and second outer bars have a semicircular edge.

15. The steering attachment of claim 11, wherein the inner bar is trapezoidal.

16. The steering attachment of claim 15, wherein the inner bar defines an acute, non-isosceles trapezoid.

17. The steering mechanism of claim 11, wherein the corresponding apertures in the inner bar are elongate apertures defined by a plurality of overlapping circular apertures.

18. The steering mechanism of claim 11, wherein the attachment members are configured to be removed and replaced without tools.

19. The steering mechanism of claim 11, wherein the link is configured to pivot through a range of more than ninety degrees.

\* \* \* \* \*